United States Patent
Achour

(10) Patent No.: US 12,081,245 B2
(45) Date of Patent: Sep. 3, 2024

(54) METHOD AND APPARATUS FOR A FREQUENCY-SELECTIVE ANTENNA

(71) Applicant: BDCM A2 LLC, Dover, DE (US)

(72) Inventor: Maha Achour, Encinitas, CA (US)

(73) Assignee: BDCM A2 LLC, Dover, DE (US)

( * ) Notice: Subject to any disclaimer, the term of this patent is extended or adjusted under 35 U.S.C. 154(b) by 0 days.

(21) Appl. No.: 17/551,088

(22) Filed: Dec. 14, 2021

(65) Prior Publication Data

US 2022/0109459 A1   Apr. 7, 2022

Related U.S. Application Data

(63) Continuation of application No. 16/195,792, filed on Nov. 19, 2018, now Pat. No. 11,201,630.

(60) Provisional application No. 62/587,618, filed on Nov. 17, 2017.

(51) Int. Cl.
| | |
|---|---|
| H04B 1/00 | (2006.01) |
| H01Q 1/24 | (2006.01) |
| H01Q 1/36 | (2006.01) |
| H01Q 3/42 | (2006.01) |
| H01Q 5/30 | (2015.01) |
| H01Q 5/42 | (2015.01) |
| H01Q 15/00 | (2006.01) |
| H01Q 21/00 | (2006.01) |
| H01Q 21/06 | (2006.01) |

(Continued)

(52) U.S. Cl.
CPC .......... *H04B 1/0064* (2013.01); *H01Q 1/243* (2013.01); *H01Q 1/36* (2013.01); *H01Q 3/42* (2013.01); *H01Q 5/30* (2015.01); *H01Q 5/42* (2015.01); *H01Q 15/0086* (2013.01); *H01Q 21/0025* (2013.01); *H01Q 21/061* (2013.01); *H04L 5/0037* (2013.01); *H04W 72/0453* (2013.01)

(58) Field of Classification Search
CPC .......... H04B 1/0064; H01Q 5/30; H01Q 5/42; H01Q 1/243; H01Q 1/36; H01Q 3/42; H01Q 15/0086; H01Q 21/0025; H01Q 21/061; H04L 5/0037; H04W 72/0453
USPC ...................................................... 455/452.1
See application file for complete search history.

(56) References Cited

U.S. PATENT DOCUMENTS

| | | | | |
|---|---|---|---|---|
| 4,368,469 | A | * | 1/1983 | Ott ............................ G01S 3/46 342/368 |
| 4,743,914 | A | * | 5/1988 | Schuss ................. H01Q 3/2658 343/781 CA |

(Continued)

OTHER PUBLICATIONS

G. Mumcu, et al., "Metamaterial Antennas," in Frontiers in Antennas Next Generation Design & Engineering, New York, NY, McGraw Hill, 2011, ch. 5, pp. 203-239.

(Continued)

*Primary Examiner* — April G Gonzales
(74) *Attorney, Agent, or Firm* — Dinsmore & Shohl LLP

(57) ABSTRACT

Examples disclosed herein relate to an antenna system. The antenna system has a transceiver unit adapted to receive a composite communication signal, wherein the composite communication signal is a mix of multiple individual communication signals transmitted at different frequencies, a radiating structure comprising multiple subarrays of radiating elements, each subarray responsive to a different frequency, and an antenna controller adapted to map each communication signal to a user equipment.

19 Claims, 8 Drawing Sheets

(51) Int. Cl.
*H04L 5/00* (2006.01)
*H04W 72/0453* (2023.01)

(56) References Cited

U.S. PATENT DOCUMENTS

| | | | | |
|---|---|---|---|---|
| 6,043,790 | A * | 3/2000 | Derneryd | H01Q 3/26 342/368 |
| 6,687,492 | B1 * | 2/2004 | Sugar | H04L 25/0204 455/67.11 |
| 6,871,081 | B1 * | 3/2005 | Llewellyn | H04W 88/085 455/426.2 |
| 7,405,698 | B2 * | 7/2008 | de Rochemont | H01Q 15/006 343/909 |
| 7,847,739 | B2 | 12/2010 | Achour et al. | |
| 7,889,129 | B2 * | 2/2011 | Fox | H01Q 21/0018 342/354 |
| 8,178,457 | B2 * | 5/2012 | de Rochemont | H01Q 5/307 501/154 |
| 8,487,832 | B2 * | 7/2013 | Lam | H01Q 15/0086 343/909 |
| 8,493,281 | B2 * | 7/2013 | Lam | H01Q 19/06 343/753 |
| 8,593,819 | B2 * | 11/2013 | de Rochemont | H01Q 5/307 501/154 |
| 8,633,866 | B2 * | 1/2014 | Sarabandi | H01Q 15/0026 343/909 |
| 8,715,839 | B2 * | 5/2014 | de Rochemont | H01C 17/003 336/200 |
| 8,803,739 | B2 * | 8/2014 | Rajgopal | H01Q 1/38 343/720 |
| 8,922,347 | B1 * | 12/2014 | de Rochemont | H02J 50/27 343/803 |
| 8,952,858 | B2 * | 2/2015 | de Rochemont | H01Q 9/16 343/803 |
| 9,094,102 | B2 * | 7/2015 | Corman | H01Q 3/26 |
| 9,184,496 | B2 * | 11/2015 | Duwel | H01Q 1/364 |
| 9,190,738 | B2 * | 11/2015 | Alexopoulos | H01Q 1/2283 |
| 9,236,892 | B2 * | 1/2016 | Dupuy | H01Q 3/36 |
| 9,293,821 | B2 * | 3/2016 | Duwel | H01Q 3/446 |
| 9,425,890 | B2 * | 8/2016 | Corman | H04B 7/10 |
| 9,520,649 | B2 * | 12/2016 | de Rochemont | H01Q 15/0046 |
| 9,711,866 | B1 * | 7/2017 | Doane | H01Q 19/13 |
| 9,786,986 | B2 * | 10/2017 | Johnson | H01Q 3/26 |
| 9,882,274 | B2 * | 1/2018 | de Rochemont | H01Q 1/38 |
| 9,905,928 | B2 * | 2/2018 | de Rochemont | H01C 7/003 |
| 10,566,683 | B1 * | 2/2020 | Campbell | H01Q 3/36 |
| 11,451,944 | B2 * | 9/2022 | Achour | H04B 7/155 |
| 2008/0048917 | A1 * | 2/2008 | Achour | H01Q 9/0407 343/700 MS |
| 2009/0135087 | A1 * | 5/2009 | Gummalla | H01Q 15/0086 343/909 |
| 2010/0060544 | A1 * | 3/2010 | Penev | H01Q 9/0442 343/876 |
| 2010/0123635 | A1 * | 5/2010 | Lopez | H01Q 5/364 343/753 |
| 2011/0175789 | A1 * | 7/2011 | Lee | H01Q 1/243 333/17.1 |
| 2011/0194551 | A1 * | 8/2011 | Lee | H04L 5/0048 375/267 |
| 2012/0039242 | A1 * | 2/2012 | Alexiou | H04W 72/52 370/315 |
| 2014/0203969 | A1 * | 7/2014 | Maltsev | H04B 7/0617 342/385 |
| 2014/0210666 | A1 * | 7/2014 | Maltsev | H01Q 3/40 343/893 |
| 2014/0375525 | A1 * | 12/2014 | Shi | H01Q 21/068 343/893 |
| 2015/0022407 | A1 * | 1/2015 | Piazza | H01Q 3/01 343/731 |
| 2015/0022421 | A1 * | 1/2015 | Vigano | H01Q 21/245 343/853 |
| 2015/0229028 | A1 * | 8/2015 | Bily | H01Q 15/0006 342/371 |
| 2016/0087349 | A1 * | 3/2016 | Lee | H01Q 21/061 342/373 |
| 2016/0141754 | A1 * | 5/2016 | Leyh | H01Q 13/28 342/372 |
| 2016/0345189 | A1 * | 11/2016 | Miyagawa | H04W 72/0446 |
| 2018/0152235 | A1 * | 5/2018 | Smoot | H04B 7/1851 |
| 2022/0247074 | A1 * | 8/2022 | Zamanifekri | H01Q 3/36 |

OTHER PUBLICATIONS

Y.J. Guo, et al., "Reconfigurable Antennas for Wireless Communications," European Conference on Antennas and Propagation (EuCAP), Gothenburg, Sweden, Jun. 2013, pp. 165-168.

Y.J. Cheng, "Substrate Integrated Waveguide Frequency-Agile Slot Antenna and its Multibeam Application," Progress In Electromagnetics Research, vol. 130, pp. 153-168, Aug. 2012.

G.H. Huff, et al. ,"Reconfigurable Antennas," in Frontiers in Antennas Next Generation Design & Engineering, New York, NY, McGraw Hill, 2011, ch. 7, pp. 271-303.

H. Lee, "A Compact Single Radiator CRLH-Inspired Circularly Polarized Leaky-Wave Antenna Based on Substrate- Integrated Waveguide," IEEE Transactions on Antennas and Propagation, vol. 63, No. 10, pp. 4566-4572, Oct. 2015.

M. Salarkaleji, et al., "Two-Dimensional Full-Hemisphere Frequency Scanning Array Based on Metamaterial Leaky Wave Antennas and Feed Networks," IEEE MTT-S International Microwave Symposium (IMS), San Francisco, CA, May 2016.

D. Patron, "Compact Reconfigurable Antennas for Wireless Systems and Wearable Applications," Ph.D. dissertation, Dept. of Electrical and Computer Eng., Drexel University, Philadelphia, PA, May 2015.

J. Reis, et al., "Two-Dimensional Antenna Beamsteering Using Metamaterial Transmitarray," European Conference on Antennas and Propagation (EuCAP), Lisbon, Portugal, Aug. 2015.

M.C. Johnson, "Self-Optimizing Metamaterial Antennas," Ph.D. dissertation, Dept. of Applied Mathematics, Univ. of Washington, Seattle, WA, 2014.

S. Gupta, "Analysis and Design of Substrate Integrated Waveguide-Based Antennas for Millimeter Wave Applications," M.S. thesis, Dept. of Electrical and Computer Eng., Concordia Univ., Montreal, Quebec, Canada, May 2016.

C. Tripon-Canseliet, et al., "Contribution of MetaMaterials to Improvement of Scan Performance and Reconfigurability of Phased Array Antennas," International Radar Conference, Lille, France, Oct. 2014, pp. 1-3.

* cited by examiner

METHOD AND APPARATUS FOR A FREQUENCY-SELECTIVE ANTENNA

CROSS-REFERENCE TO RELATED APPLICATIONS

This application claims priority to U.S. Non-Provisional application Ser. No. 16/195,792, entitled "Method And Apparatus For A Frequency-Selective Antenna," filed on Nov. 19, 2018, and incorporated herein by reference; which claims priority to U.S. Provisional Application No. 62/587,618, filed on Nov. 17, 2017, and incorporated herein by reference.

BACKGROUND

Current developments in the wireless communication and sensor spaces are developing more ways to target an individual user or device. In cellular communications, a system goal is to optimize efficiency and focus energy directly to a user. To achieve this level of performance, systems add additional antennas and complex circuitry that increases their cost and footprint, while incurring latency and delay in processing.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Methods and apparatuses for a frequency-selective antenna are disclosed. The frequency-selective antenna incorporates metastructures that are capable of manipulating electromagnetic ("EM") waves to provide directed wireless transmission between multiple devices. In various examples, the frequency-selective antenna enables transmission of multiple signals, each having a unique frequency, wherein transmissions at a given frequency are directed to an individual user or group of users. The transmission information for the multiple signals is received as a composite information signal at the user's device, wherein the radiating elements in the metastructures are configured for specific frequencies. Each radiating element has associated electromagnetic properties, including the resonant frequency and the phase of a radiated signal, that are adjustable using a frequency-selective control applied to the radiating element. Such frequency-selective control enables transmission of a user signal from a specific radiating element at a unique frequency and phase, thereby allowing a wireless transmission system to direct specific transmissions to specific users.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
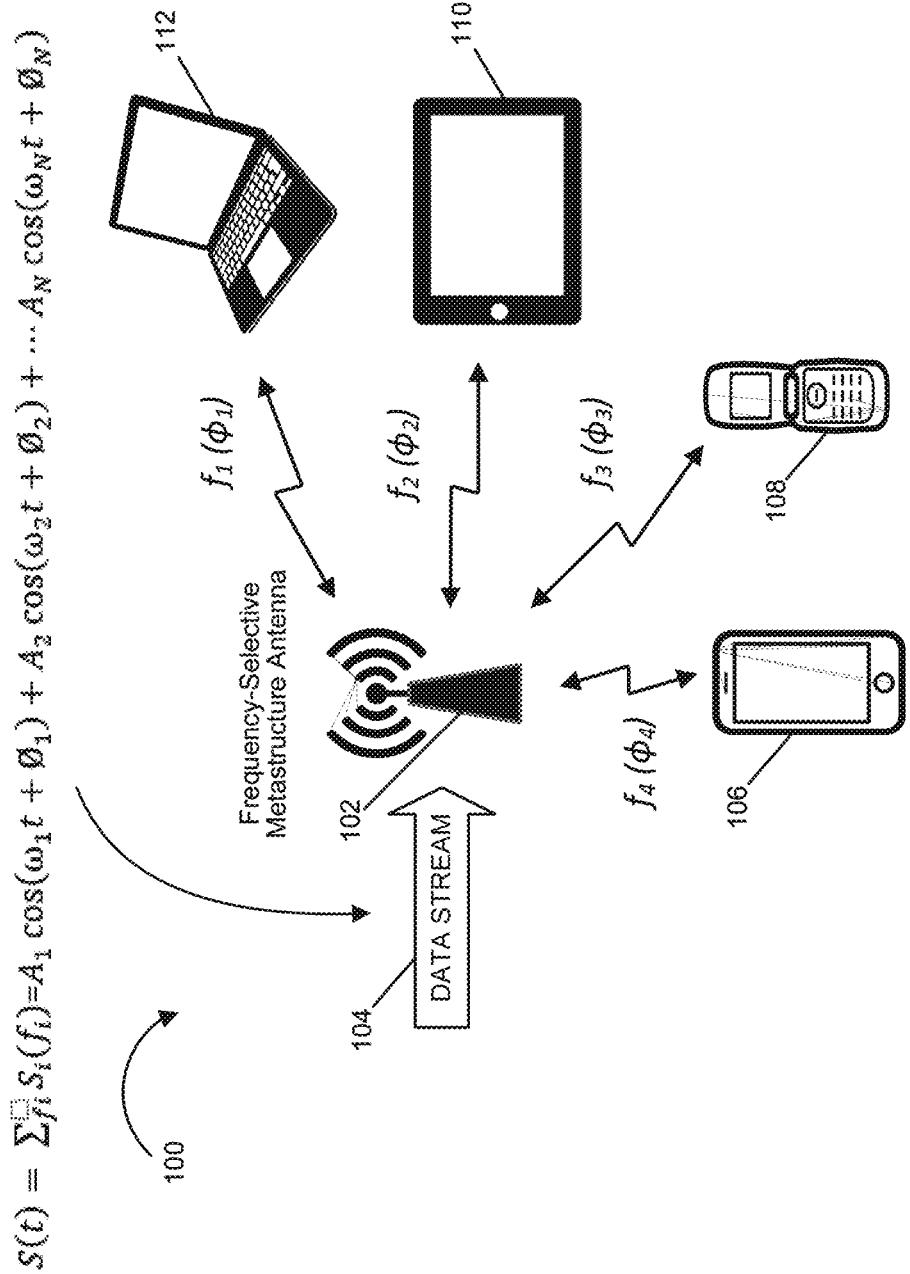
FIG. 1 is a schematic diagram of a wireless transmission system having a frequency-specific, multi-frequency antenna in accordance with various examples.

FIG. 1 illustrates a wireless system 100, having a transmitter 102, such as a cellular base station, Wi-Fi control point or other wireless distribution apparatus. The transmitter 102 is configured to receive a composite data stream 104 which includes information for communications with multiple mobile devices or User Equipment ("UE"), such as, for example, UE 106-112, including smart phone 106, flip phone 108, tablet 110 and laptop 112. Transmitter 102, as described in more detail below, is a frequency-selective transmitter having a metastructure antenna to provide directed wireless transmission for UE 106-112.

Figure 2:
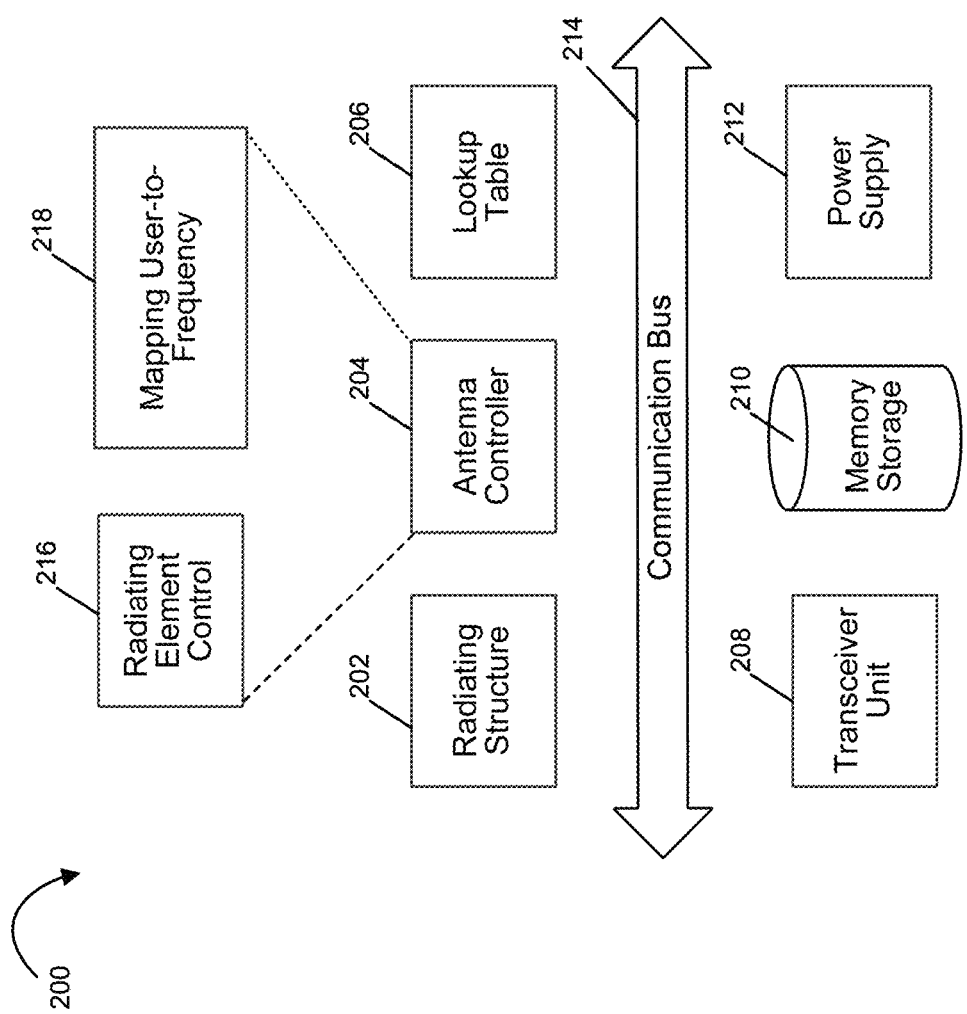
FIG. 2 illustrates a base station in accordance with various examples.

FIG. 2 illustrates the components of transmitter 102, implemented as transmitter 200, which includes a radiating structure 202, an antenna controller 204, a mapping storage or lookup table 206, a transceiver unit 208, memory storage 210, a power supply 212, and a communication bus 214. The transmitter 200 receives a composite data signal at transceiver unit 208 coupled to a communication bus 214 to provide received information to the radiating structure 202. The transmitter 200 also prepares messages for transmission through the radiating structure 202. In various examples, the radiating structure 202 is a metastructure configured for radiation of EM waves. A metastructure, as generally defined herein, is an engineered structure capable of controlling and manipulating EM radiation at a desired direction based on its geometry. There are a variety of structures that may be incorporated into the radiating structure 202 that enable the generation of multiple beams concurrently, as discussed herein below. The transceiver unit 208 includes the components to process radio frequency ("RF") signals, such as baseband processing capability, RF integrated circuits, analog-to-digital converters, and so forth. The modules of transmitter 200 communicate with each other directly or by way of communication bus 214.

Radiating structure 202 is configured on a substrate material, which may be part of system 100 or a separate structure. The antenna controller 204 includes a radiating element control module 216 that controls the radiating elements in radiating structure 202. In various examples and as described below with reference to FIG. 4, the radiating elements may include metamaterial ("MTM") cells with voltage controlled devices for controlling the EM parameters (e.g., phase) of each cell. The antenna controller 204 also includes a mapping module 218 to map a UE to a specific frequency.

Figure 3:
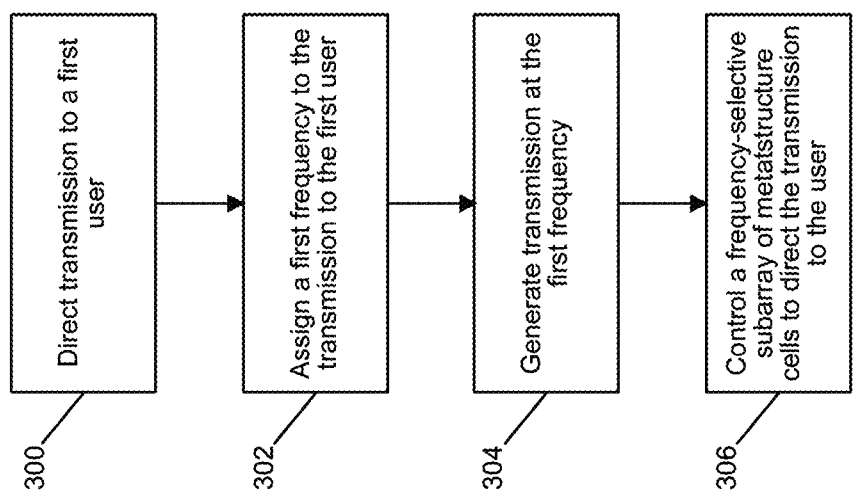
FIG. 3 is a flowchart for frequency-selective transmissions from a metastructure antenna to a user in accordance with various examples.

FIG. 3 illustrates a flowchart for frequency-selective transmissions from a metastructure antenna 202 to a user in accordance with various examples. When a transmission, such as a data transmission, is directed to a first user (300), the mapping module 218 assigns a first frequency to the transmission to the first user (302). The transmissions are then generated at the first frequency (304). The frequency-selective radiating elements of the metastructure 202 that are resonant at the first frequency are then controlled by radiating element control module 216 to direct the transmission to the user (306). Directed beams are provided through voltage applied to frequency-selective radiating elements, e.g., voltage controlled MTM cells. The frequency-selective radiating elements and their associated resonant frequencies are stored in lookup table 206, and retrieved by mapping module 218.

Figure 4:
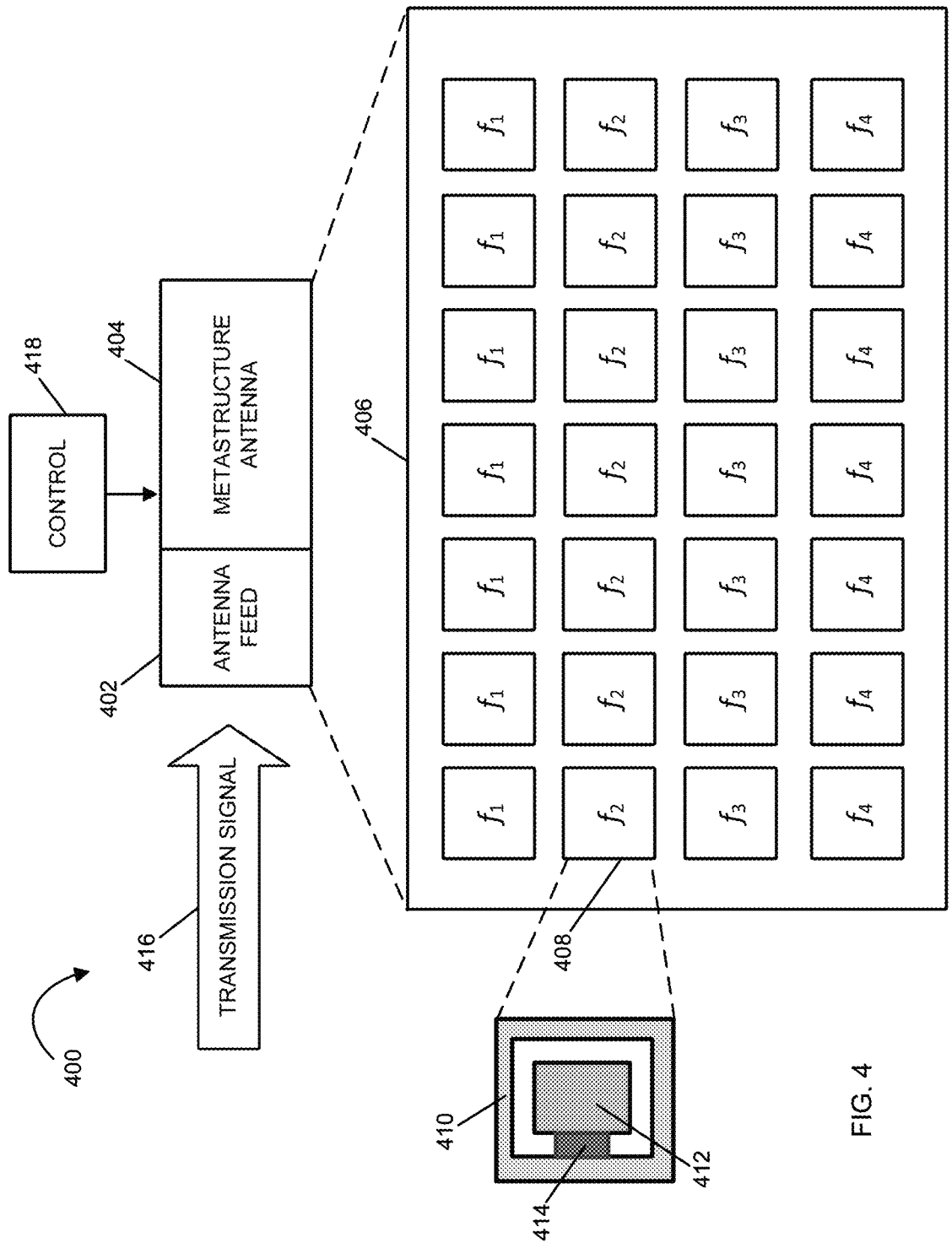
FIG. 4 is a schematic diagram of a frequency-selective antenna in accordance with various examples.

Attention is now directed to FIG. 4, which illustrates a frequency-selective antenna 400 having an antenna feed 402 and a metastructure antenna 404. Metastructure antenna 404 has an array of radiating elements or cells 406. As illustrated, the cells 406 are uniform structures. Alternate examples may be configured to include different size and/or shape cells. In one example, each cell 406 is designed to operate in the right-handed mode positive index of refraction with phase engineering on the spatial domain to achieve the desired transmission characteristics. In another example, each cell 406 may be a MTM cell. An MTM cell is an artificially structured element used to control and manipulate physical phenomena, such as the electromagnetic properties of a signal including its amplitude, phase, and wavelength. Metamaterial cells behave as derived from inherent properties of their constituent materials, as well as from the geometrical arrangement of these materials with size and spacing that are much smaller relative to the scale of spatial variation of typical applications.

A metamaterial is a geometric design of a material, such as a conductor, wherein the shape creates a unique behavior for the device. An MTM cell may be composed of multiple microstrips, gaps, patches, vias, and so forth having a behavior that is the equivalent to a reactance element, such as a combination of series capacitors and shunt inductors. Various configurations, shapes, designs and dimensions are used to implement specific designs and meet specific constraints. In some examples, the number of dimensional degrees of freedom determines the characteristics of a cell, wherein a cell having a number of edges and discontinuities may model a specific-type of electrical circuit and behave in a given manner. In this way, an MTM cell radiates according to its configuration. Changes to the reactance parameters of the MTM cell result in changes to its radiation pattern. Where the radiation pattern is changed to achieve a phase change or phase shift, the resultant structure is a powerful antenna, as small changes to the MTM cell can result in large changes to the beamform. The array of cells 406 is configured so as to form a composite beamform. This may involve subarrays of the cells or the entire array.

The MTM cells 406 may include a variety of conductive structures and patterns, such that a received transmission signal is radiated therefrom. In some examples, each MTM cell may have unique properties. These properties may include a negative permittivity and permeability resulting in a negative refractive index; these structures are commonly referred to as left-handed materials ("LHM"). The use of LHM enables behavior not achieved in classical structures and materials, including interesting effects that may be observed in the propagation of electromagnetic waves, or transmission signals. Metamaterials can be used for several interesting devices in microwave and terahertz engineering such as antennas, sensors, matching networks, and reflectors, such as in telecommunications, automotive and vehicular, robotic, biomedical, satellite and other applications. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating electromagnetic waves by blocking, absorbing, enhancing, or bending waves.

In some examples, at least one of the MTM cells is coupled to a reactance control mechanism, such as a varactor to change the capacitance and/or other parameters of the MTM cell. By changing a parameter of the MTM cell, the resonant frequency is changed, and therefore, the array 406 may be configured and controlled to respond to multiple frequency bands. An example of such a cell is illustrated as MTM cell 408. MTM cell 408 has a conductive outer portion or loop 410 surrounding a conductive area 412 with a space in between. Each MTM cell 406 may be configured on a dielectric layer, with the conductive areas and loops provided around and between different MTM cells. A voltage controlled variable reactance device 414, e.g., a varactor, provides a controlled reactance between the conductive area 412 and the conductive loop 410. Varactor 414 is controlled by MTM cell control 418. The controlled reactance is controlled by an applied voltage, such as an applied reverse bias voltage in the case of a varactor. The change in reactance changes the behavior of the MTM cell 408. The voltage control is performed by MTM cell control 418 in response to identification of a position of the UE with respect to the system 100. The transceiver unit 208 provides this direction information and acts to instruct the MTM cell control 418 as to where to direct the beam.

A transmission signal 416 is provided to the antenna feed 402, wherein the transmission signal includes communication information for multiple UEs. Antenna feed 402 has a plurality of transmission lines for distributing the signal 416 to the metastructure antenna 404. The transmission signal for each UE has a corresponding frequency at which certain MTM cells 406 resonate. For example, the top row of MTM cells 406 are at a first frequency $f_1$, and they resonate or radiate at frequency $f_1$, but do not radiate EM signals at other frequencies. Similarly, the other rows of MTM cells 406 are each resonant at specific frequencies, and not respond to other frequencies. In this way, the MTM cells 406 act as specific band-pass filters.

Figure 5:
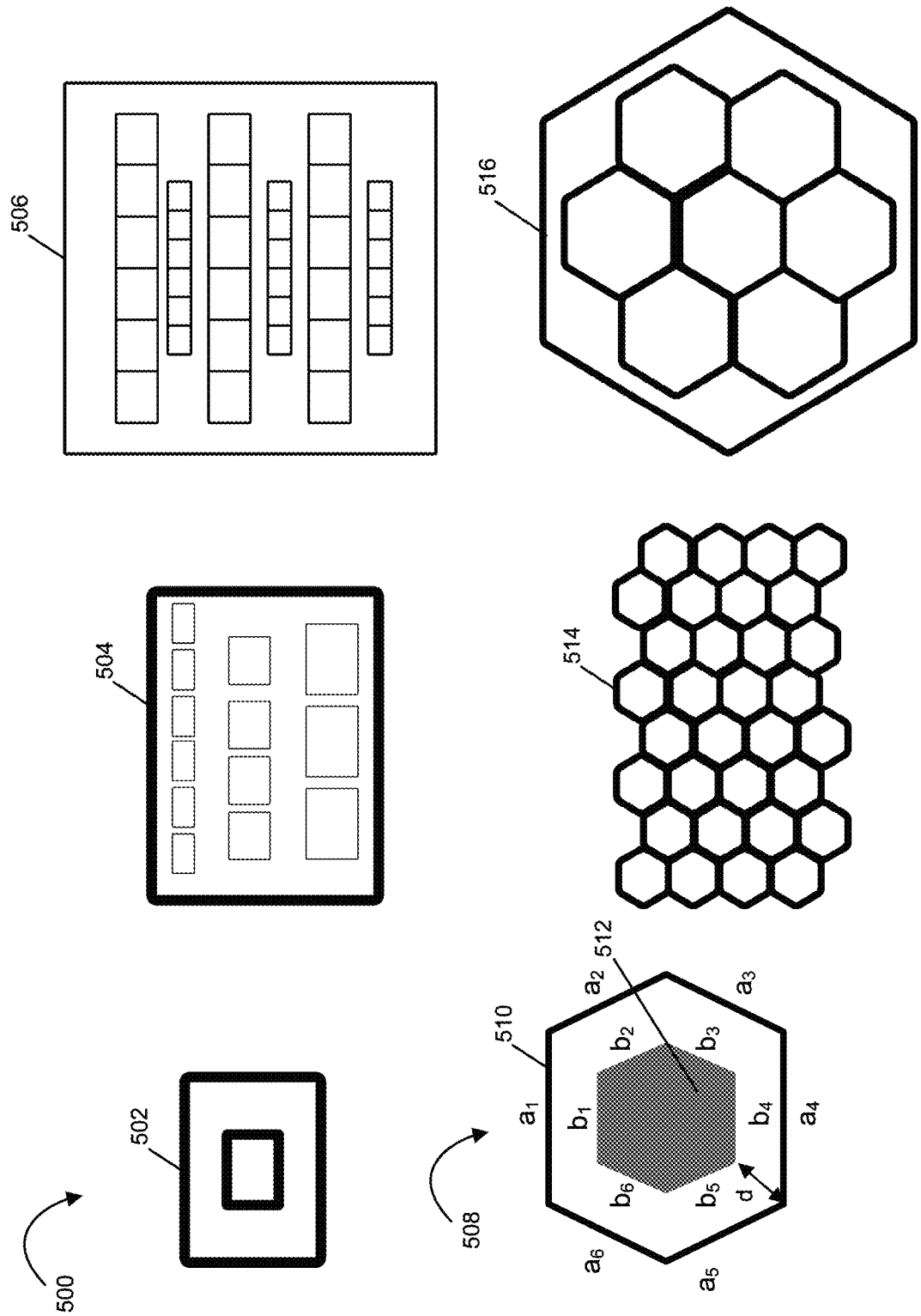
FIGS. 5-6 illustrate radiating element configurations in accordance with various examples.
Figure 6:
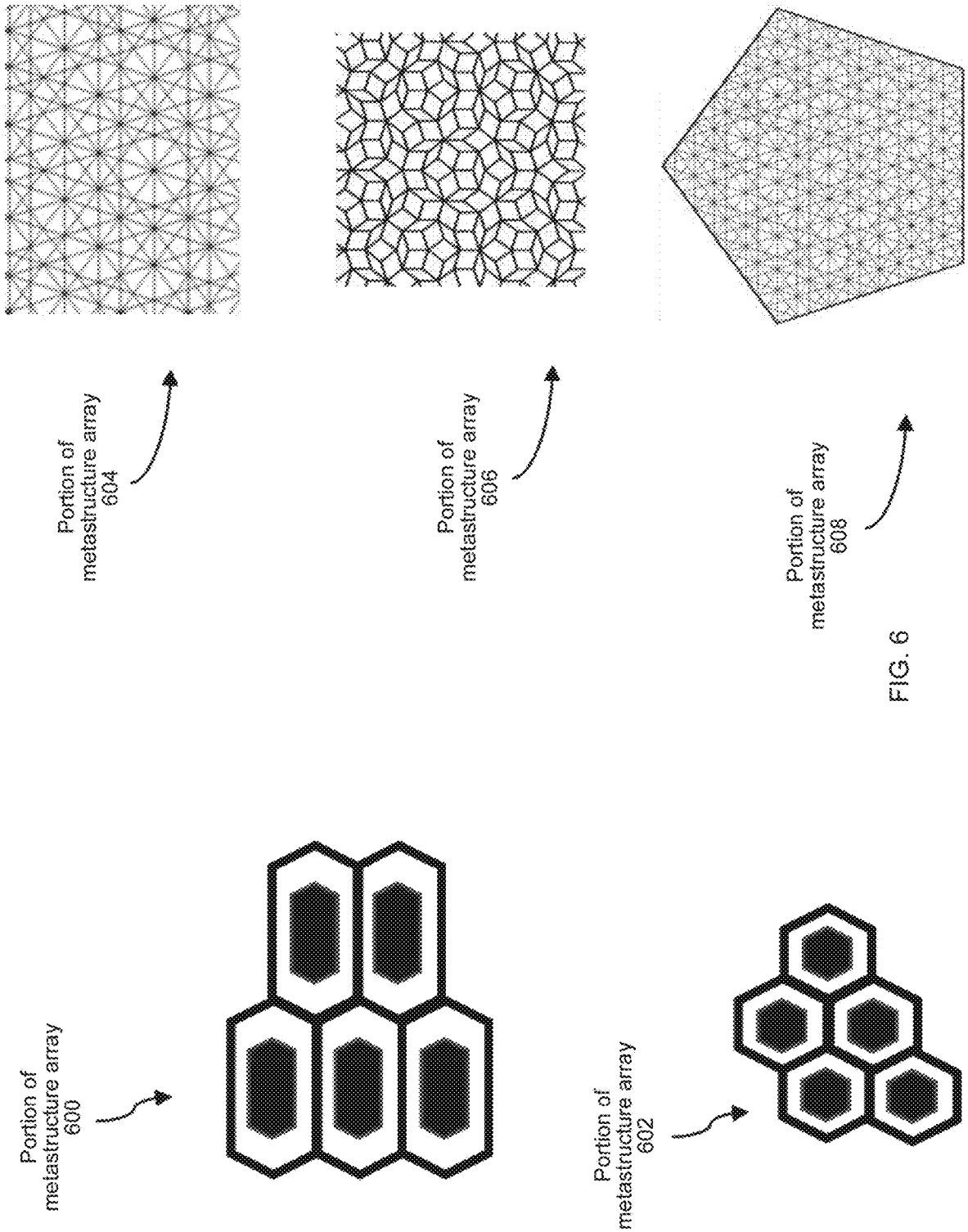

FIGS. 5-6 illustrate example configurations for radiating elements that may be used in the metastructure antenna 404. The structure of the radiating elements and the configurations illustrated are designed to accommodate the desired frequency bands. In FIG. 4, the radiating elements are organized into rows, wherein each row includes cells that resonate at a given frequency or range of frequencies. In the illustrated examples of FIGS. 5-6, the shape, size, and position of the cells are designed to respond to multiple frequency bands. The specific configuration may be designed to achieve application considerations. Cell 502 in FIG. 5 may be an MTM cell, a patch cell with a surrounding loop, or another such structure that when in an array of cells constitutes a metastructure array as in metastructure array 506. The array of cells 502 may be an array having rows of cells of different sizes, as in arrays 504-506.

In another example, each cell may have an hexagonal shape as in cell 508 to provide design flexibility for a densely packed array. Each cell 508 has an outer geometric shape, referred to herein as a hexagonal conductive loop, e.g., loop 510, and an inner geometric shape that is referred to as a hexagonal conductive patch, e.g., patch 512. The hexagonal shape provides the flexibility of design for a densely packed array, e.g., arrays 514-516, and the parametric shape enables computational design that can be easily scaled and modified while maintaining the basic shape of the hexagon. In this example, the dimensions of the shapes are geometrically similar and their relationship is proportionally maintained.

As illustrated, the sides of the hexagonal loop 510 are designated by reference letter "a" and the sides of the hexagonal patch 512 are designated by reference letter "b". The hexagonal patch 512 is centered within the hexagonal loop 510. Corresponding points on the perimeters of the loop and patch are equidistant from each other, specifically in this example, at a distance designated by "d". This configuration is repeated to form a densely packed lattice. FIG. 6 illustrates examples of scaling of various hexagonal radiating elements, and their positioning within lattices 600-608. There is a large variety of hexagonal shapes and configurations that may be implemented, both symmetric and asymmetric. Note also that although illustrated as having a hexagonal shape, a radiating element may be of another shape, e.g., circular, rectangular, etc., depending on the application. A variety of sizes, configurations and designs may be implemented.

Figure 7:
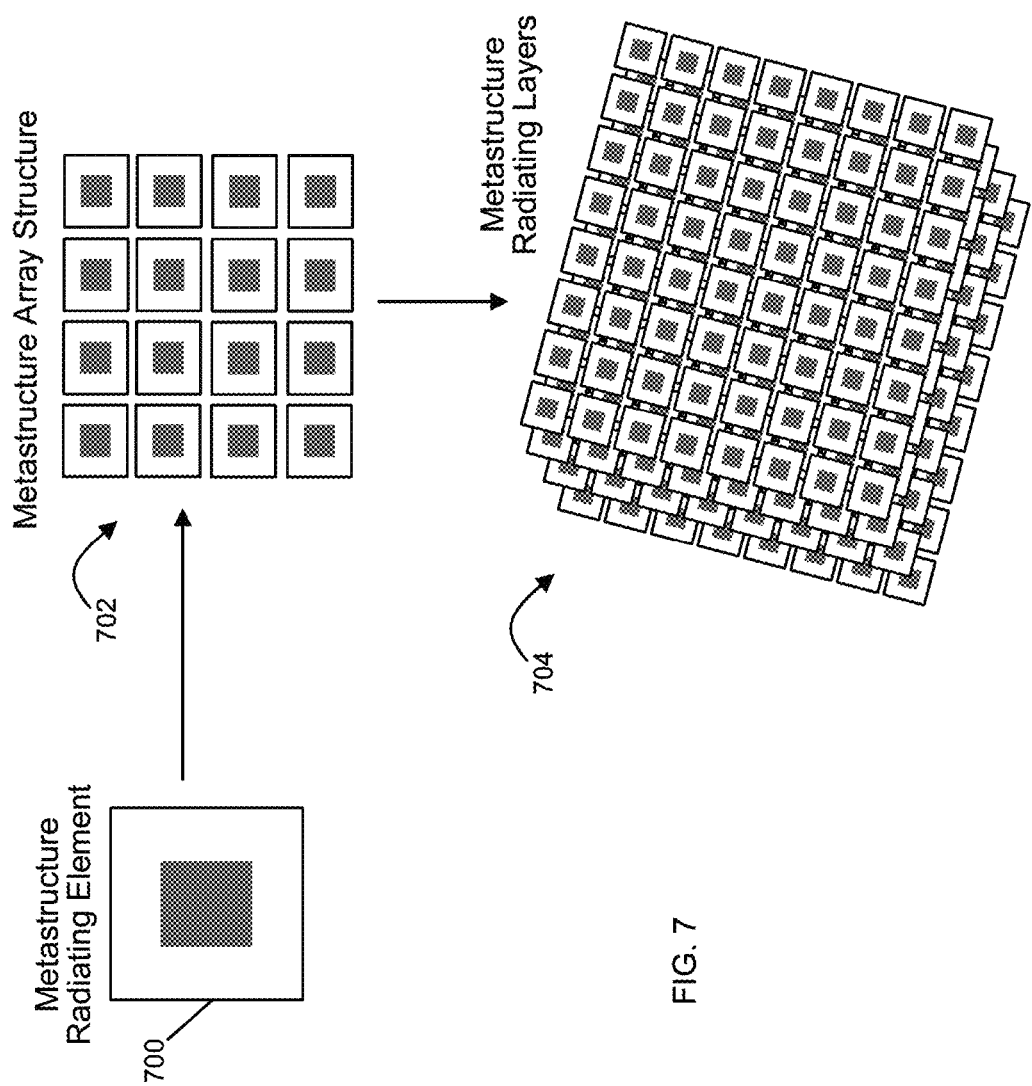
FIG. 7 is a schematic diagram of a metastructure radiating element, a single layer metastructure array and a multi-layer metastructure array in accordance with various examples.

In FIG. 7, a metastructure radiating element 700 is shown to have a rectangular shape. The metastructure radiating element 700 can be arranged in a metastructure array structure 702 as in the metastructure array of cells 406 in FIG. 4. Note that in structure 702, the radiating elements are spaced apart by a distance that is determined based on the desired radiation pattern and beam characteristics. Note also that a radiating array structure may be implemented as a layer in a multi-layer radiating array, such as metastructure radiating layers 704 having 4 layers of 8×8 radiating arrays. The number of elements in an array, the shape of the elements, the spacing between the elements, and the number of layers can all be designed to achieve a desired performance and desired multi-frequency response, with subarrays responding to different frequencies.

In some examples, each portion of the cells, or subarray of cells, is responsive to a first frequency. The subarray of cells are configured to operate together and thus to direct communications to a given user or in a specific direction. This may be used in a cellular communication system to direct a communication stream to a given user and maximize available transmission energy to that user, and thus increase the throughput to that user. This is a consideration in many applications, such as in video streaming to a mobile device. In a congested environment, it helps the transmission to each user, and allows the system to adjust the energy used for each transmission. For example, the system 100 of FIG. 1 may detect that a user that is in a video chat, a second user on an audio call, and a third user that is streaming a sports game. The system 100 is able to determine the bandwidth and throughput requirements of each of the users. This information is then used to adjust the transmission directly to each user and balance the available transmission energy accordingly. In some examples, the cells in an antenna lattice include varactors, or electrical parameter controllers, that enable the system to change the resonant frequency of a given cell or subarray of cells. In this way, the system is able to configure the cells into a variety of subarrays.

Figure 8:
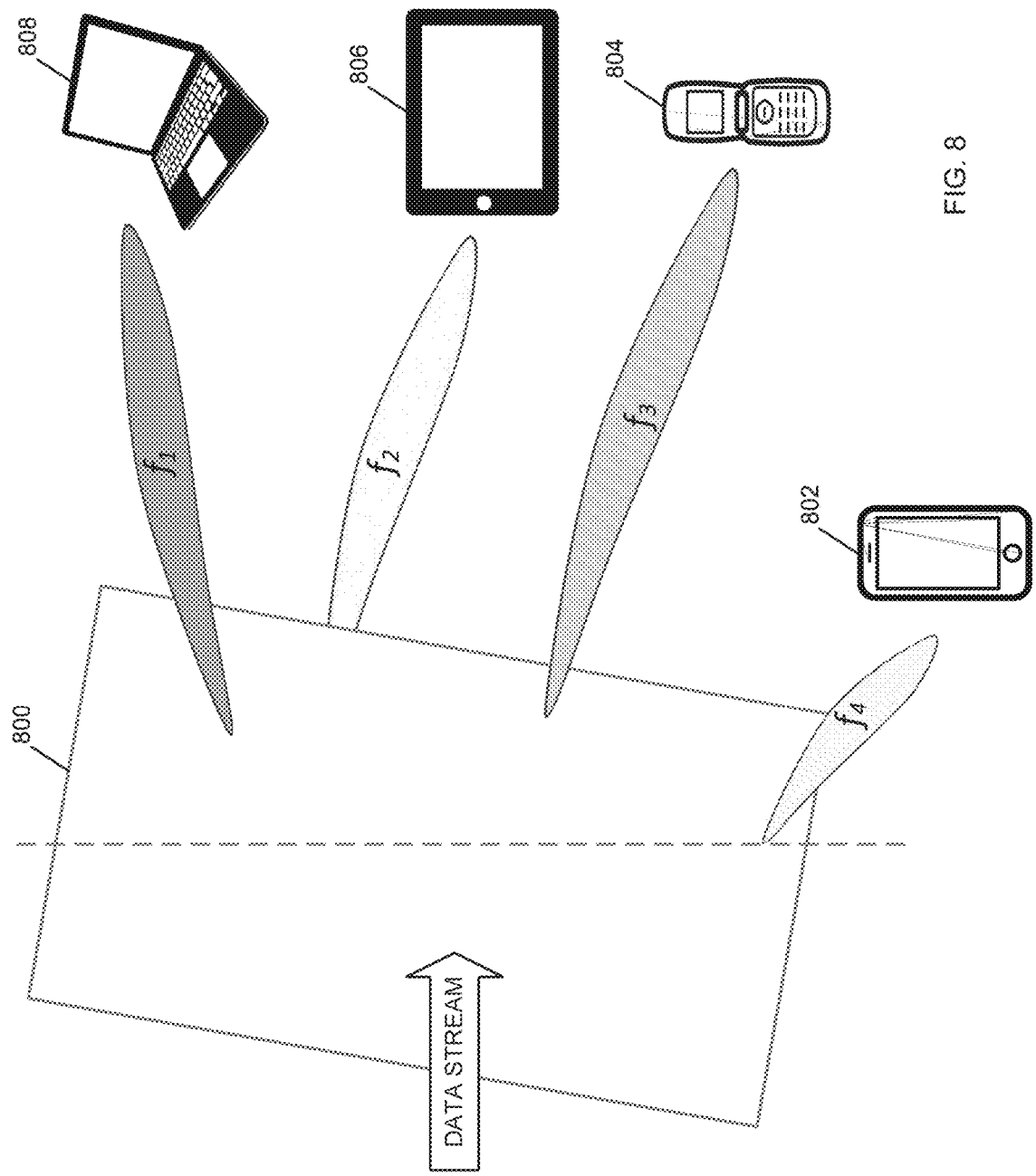
FIG. 8 is a schematic diagram illustrating the operation of a wireless transmission system implemented as in FIG. 1 and in accordance with various examples.

The examples of FIGS. 5-7 provide methods and apparatuses for providing multiple frequency signals from a single metastructure antenna having cells of different resonant frequencies in a wireless transmission system. The frequencies supported determine the shape and configuration of the cells, which may be positioned in an array or lattice configuration. In some examples, an antenna controller, e.g., controller 204 of FIG. 2, adjusts the EM characteristics of one or more cells to direct a transmission beam to a UE. The antenna system receives the composite signal of information for multiple users and assigns a frequency to each user. The metastructure antenna has subarrays of cells that respond to each of the frequencies. FIG. 8 illustrates operation of system 100 of FIG. 1, wherein transmission to each UE 802-808 from metastructure antenna 800 is at the corresponding frequency assigned to that user.

In the illustrated example, a first user receives signals at frequency $f_1$, and the antenna controller adjusts the EM parameters of the subarray of cells that respond to the frequency $f_1$. The adjustment changes the phase of individual cells such that their combined radiation forms a beam directed at the user. The beam direction concentrates energy to that user. In some situations, the beam is a pencil beam, or very thin beam, and in other situations, such as a multi-cast to multiple users, the beam may be sized to reach multiple users with a same transmission. As the subarrays responsive to frequency $f_1$ are not responsive to the other frequencies, they do not radiate these frequencies of the composite signal, which includes all the frequencies. Each subarray responds to its frequency, while the other frequencies have little to no effect on that subarray. This concurrent transmission to multiple users with a frequency-selective directed antenna enables increases in throughput of a wireless system.

In some systems, the subarrays may be used for different functions, such as one subarray for cellular communications and another for functions using the Industrial, Scientific, Medical ("ISM") band. The ability for a single metastructure antenna array to provide multiple frequency transmissions is a great improvement over other wireless systems. The metastructure antenna described above is particularly applicable for directed beam generation in a wireless transmission device. This directivity may be used to improve the capabilities of a communication system, such as to enable $5^{th}$ Generation ("5G") communications.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A frequency-selective antenna system, comprising:
    a radiating structure comprising multiple subarrays of radiating elements, wherein a first subarray is responsive to a first frequency and a second subarray is responsive to a second frequency different from the first frequency;
    a feed structure coupled to the radiating structure having analog components positioned along transmission paths to the radiating elements;
    an antenna controller adapted to adjust at least one parameter of the analog components on at least one transmission path to map first frequency signals to a corresponding target node in a communication system;
    a transceiver unit adapted to prepare composite communication signals having signals of different frequencies; and a memory storage device coupled to the antenna controller to store a correspondence between radiating elements and associated frequencies.

2. The frequency-selective antenna system of claim 1, wherein the radiating structure comprises a metastructure.

3. The frequency-selective antenna system of claim 1, further comprising:
a transceiver unit adapted to receive communication signals and process according to their corresponding target nodes.

4. The frequency-selective antenna system of claim 1, wherein the radiating structure radiates the different frequency signals concurrently.

5. The frequency-selective antenna system of claim 1, wherein the memory storage device comprises a lookup table.

6. The frequency-selective antenna system of claim 1, wherein the antenna controller acts to change a phase shift of a radiation signal.

7. The frequency-selective antenna system of claim 1, wherein the subarrays are configurable.

8. The frequency-selective antenna system of claim 1, wherein the radiating elements are configured in multiple layers.

9. The frequency-selective antenna system of claim 1, wherein the radiating elements are configured as patch antenna structures.

10. A method for a frequency-selective antenna, comprising:
receiving data for a first transmission directed to a first node in a wireless communication system;
assigning a first frequency to the data for the first transmission;
generating the first transmission at the first frequency;
configuring a first subarray of radiating elements within the frequency selective antenna;
preparing composite communication signals having signals of different frequencies; and
controlling the first subarray to direct the first transmission at the first frequency to the first node.

11. The method as in claim 10, further comprising receiving a transmission from the first node at the first frequency.

12. The method as in claim 10, further comprising:
receiving data for a second transmission directed to a second node in the wireless communication system;
assigning a second frequency to the data for the second transmission;
generating the second transmission at the second frequency;
configuring a second subarray of radiating elements within the frequency selective antenna; and
controlling the second subarray to direct the second transmission at the second frequency to the second node.

13. The method of claim 12, further comprising receiving a composite mix of a first communication signal at the first frequency and a second communication signal at the second frequency.

14. A wireless communication system, comprising:
a frequency-selective antenna, comprising:
a plurality of radiating elements responsive to different frequencies;
a controller coupled to the plurality of radiating elements;
a transceiver coupled to the frequency-selective antenna and adapted to prepare composite communication signals having signals of different frequencies;
a feed network coupling the transceiver to the plurality of radiating elements, comprising a plurality of transmission paths; and
a memory storage device coupled to the controller, mapping radiating elements to frequencies.

15. The wireless communication system as in claim 14, wherein the transceiver is adapted to transmit a composite mix of signals at different frequencies.

16. The wireless communication system as in claim 14, wherein the transceiver is adapted to receive a composite mix of signals at different frequencies.

17. The wireless communication system as in claim 14, wherein the controller is adapted to change electrical parameters of the radiating elements.

18. The wireless communication system as in claim 14, wherein the plurality of transmission paths include analog elements to adjust a change in phase of a transmission signal, and the controller is adapted to change parameters of the plurality of transmission paths to achieve the change in phase.

19. The wireless communication system as in claim 14, wherein the radiating elements are configured in subarrays.

* * * * *